Patented June 21, 1938

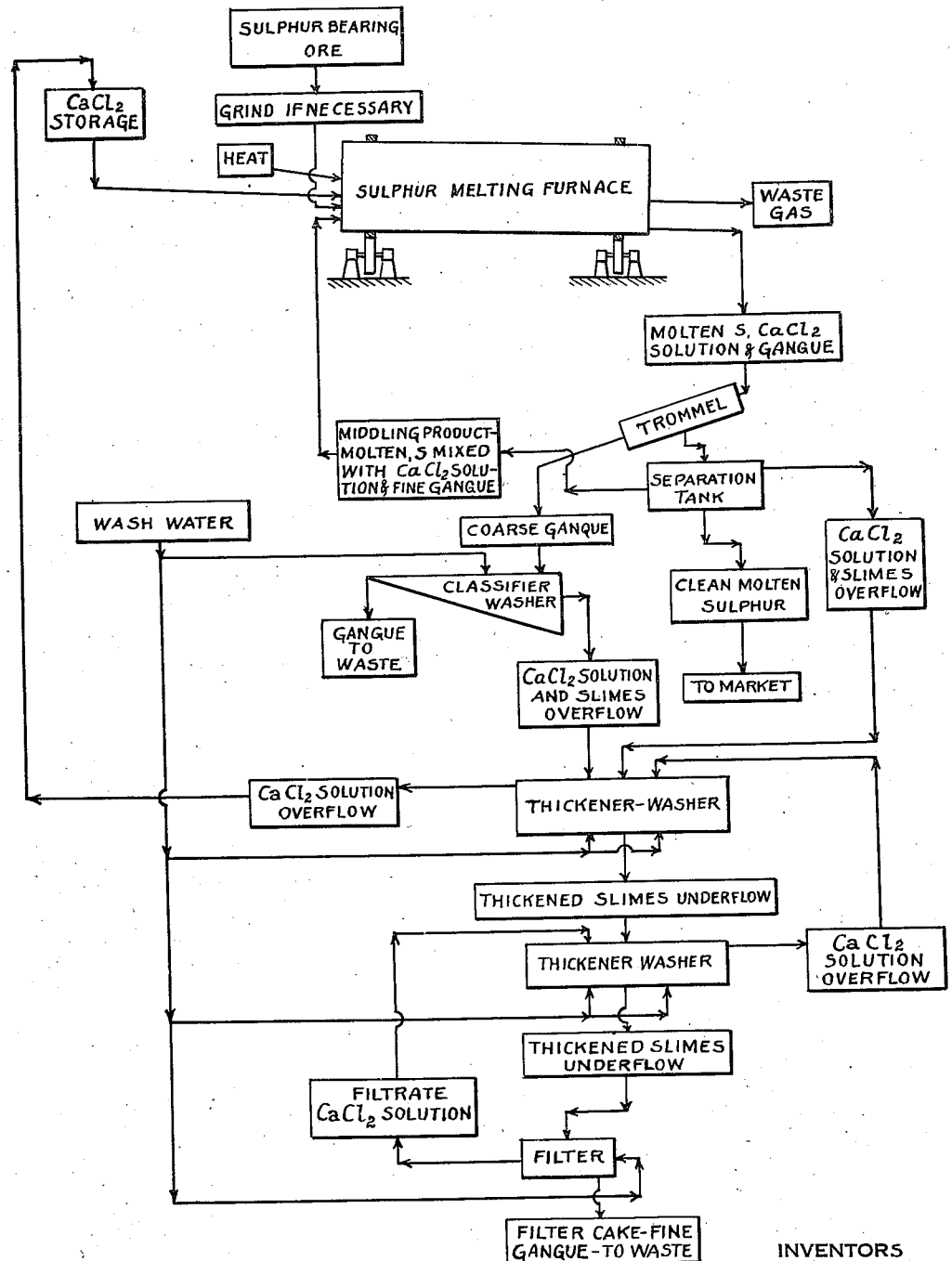

2,121,544

UNITED STATES PATENT OFFICE 2,121,544

RECOVERY OF SULPHUR

Ernest Klepetko, Pacific Palisades, and Leo G. Wright, Los Angeles, Calif.

Application February 5, 1937, Serial No. 124,268

8 Claims. (Cl. 23—229)

This invention relates to the recovery of sulphur, and has for its principal object the provision of an improved method of recovering sulphur from sulphur ores. More particularly, the invention provides an improved method for recovering sulphur from sulphur ores (that is, ores containing sulphur in the elemental form) by a heating operation in the course of which the sulphur of the ore is melted, and after which the sulphur, while still molten, is separated from the unfused residue of the ore.

A number of fairly extensive deposits of sulphur ores, containing elemental sulphur more or less intimately mixed with various minerals, are known, and a considerable amount of work has been done on the problem of recovering sulphur from such ores. In general this work has led to proposals for separating the sulphur from the ore by melting the sulphur with steam under pressure, and although it is possible to melt the sulphur in this manner and to separate it from the unfused residue, processes based on proposals of this nature have not been suitable for commercial development in competition with the well known Frasch process for recovering sulphur from deep beds.

One of the chief objections to the use of steam as an agent for melting sulphur from sulphur ores is the necessity for employing the steam under fairly high pressures (generally at least 40 pounds per square inch and usually higher) in order that its temperature will be sufficiently high. On the other hand, the use of so-called "dry" heat—hot burner gases and the like—has been found to be objectionable for various reasons. In the first place, it is difficult to control the temperature prevailing during the melting operation if "dry" heat is employed, and if the temperature exceeds about 150° C., the melted sulphur becomes extremely viscous and virtually impossible to separate from the mineral impurities with which it is associated. Once molten sulphur thus has been rendered viscous by overheating, it will not become fluent simply by cooling to below the temperature at which it became viscous—it must be cooled to below the point of solidification and be again melted in the proper temperature range, or it must be vaporized, condensed, and again melted in the proper temperature range. In the second place, even if the temperature is closely controlled while employing "dry" heat, it has been found that sulphur thus melted does not separate easily from the unfused residue of the ore. For example, if an ore containing elemental sulphur and mineral impurities is heated, by means of "dry" heat, to above the melting point of the sulphur but below about 150° C., a pasty mass of molten sulphur and unfused mineral particles, from which the sulphur does not readily separate, is obtained.

It has been found that if the ore is heated to above the melting point of sulphur in the presence of a substantial body of already molten sulphur, effective separation of the melted sulphur may be secured. Thus, if a sulphur ore is introduced into a molten body of sulphur, the sulphur of the ore is melted by the molten sulphur and it separates readily and quite completely from the unfused mineral residue.

It is possible to regard the body of molten sulphur as a solvent for the sulphur of the ore— as an ideal solvent, in fact, because the "solution" obtained is not made up of a plurality of components having different physical or chemical properties. The molten sulphur comes into intimate contact with all exposed surfaces of the sulphur ore, and as the sulphur of the ore is heated to its melting point, it is promptly incorporated, or "dissolved", in the body of molten sulphur. The unfused mineral residue of the ore thereby becomes simply a solid impurity in the molten sulphur "solution", and so long as the latter is kept fluent, the separation of the solid impurities may be accomplished without great difficulty.

In accordance with the present invention, sulphur is melted from sulphur ores by heating the ore above the melting point of sulphur in the presence of a substantial body of already molten sulphur. The temperature of the body of molten sulphur is kept below the temperature at which it would become viscous (about 150° C.) and heat is supplied only in an amount sufficient to melt the sulphur of the ore. The melted sulphur and the unfused residue, or gangue, subsequently are separated from one another, the gangue being discarded and the sulphur prepared in any suitable manner for the market.

The process of the invention advantageously is carried out continuously, ore being charged continuously into a suitable melting furnace in which a substantial body of molten sulphur is maintained and melted sulphur and gangue being continuously withdrawn from the furnace. The sulphur is separated from the gangue, for example by a screening operation, after withdrawal from the furnace. Advantageously a portion of the separated molten sulphur is returned to the melting furnace to maintain an adequate body of molten sulphur therein.

In the preferred process of the invention, a layer of an aqueous medium having a boiling point above the melting point of the sulphur is maintained over the melted sulphur in the furnace. This layer of aqueous medium primarily serves a twofold purpose—is protects the molten sulphur from combustion and prevents the escape of sulphur vapors, and it materially aids in preventing heating of the molten sulphur to the temperature at which it would become viscous.

A water solution of a suitable compound is employed as the aqueous medium used in carrying out the preferred process of the invention. Almost any compound sufficiently soluble in water to give a solution having a boiling point above the melting point of sulphur may be used in preparing the solution, but generally calcium chloride is preferred because of its relative cheapness and high solubility. A calcium chloride solution having a boiling point of about 125° C. to 130° C., which is a satisfactory temperature at which to carry out the melting operation, may be prepared without difficulty. Another compound suitable for use in preparing the aqueous solution is ethylene glycol. In some respects this compound is superior to calcium chloride, because water solutions containing it in high concentration are of relatively low density and viscosity. Its chief drawback to commercial use is its relatively high cost.

The aqueous medium is introduced into the melting furnace along with the ore, and in the furnace it forms a layer floating on top of the molten sulphur. It is withdrawn from the furnace with the gangue and molten sulphur either continuously or intermittently, depending on how the furnace is being operated, and after such withdrawal it is separated from the molten sulphur and coarse gangue. The separated aqueous medium contains a considerable amount of impurities in the form of finely divided solid matter (gangué), and it is suitably treated to eliminate such impurities. After such treatment, the clarified aqueous medium is employed in the treatment of a further quantity of sulphur ore in the melting furnace.

Separation of the molten sulphur from the aqueous medium may be accomplished by gravity in a suitable settling tank. Molten sulphur is withdrawn from the bottom of the tank, and the aqueous medium from the upper part of the tank. It is sometimes advantageous also to withdraw from the tank a middling product, taken about from the interface of the molten sulphur and aqueous medium and consisting essentially of a mixture of molten sulphur with some aqueous medium and finely divided gangue, which is reintroduced into the sulphur melting furnace to aid in maintaining an adequate body of molten sulphur in the furnace.

A specific embodiment of the preferred process of the invention is illustrated by the accompanying flowsheet. Sulphur bearing ore, containing sulphur in elemental form, is ground, if necessary, to suitable size for treatment in a sulphur melting furnace. It is preferred not to grind the ore too finely; ore particles that will pass through a 4 or 5 mesh screen are small enough, and larger ore particles may be employed if desired.

The ground ore is charged directly into a suitable melting furnace. A wide variety of furnaces may be successfully adapted to use in the process of the invention, and the furnace may be designed either for intermittent or continuous operation. It is preferred, however, to employ a rotating furnace capable of continuous operation in carrying out the process of the invention. With such a furnace, the ground sulphur-bearing ore is charged at one end. The furnace is inclined somewhat downwardly from the end at which the ore is charged, but this downward inclination should not be very great because the material in the furnace is largely molten and it should not flow through the furnace too rapidly or accumulate to too great an extent at one end of the furnace.

A substantial body of molten sulphur is maintained at all times during operation within the furnace. The ore as it is charged into the furnace, comes in contact with the body of molten sulphur and is at least partially immersed in it. Heat is supplied to the charge in the furnace in sufficient amount to melt the sulphur of the ore but insufficient to raise the temperature of the molten sulphur to the point at which it would become viscous (about 150° C.). A satisfactory working temperature for the furnace is about 125° C. to 130° C., which is about 10° C. to 15° C. above the melting point of sulphur.

A layer of an aqueous medium having a boiling point above the melting point of sulphur but below about 150° C. (preferably at about the working temperature of the furnace—say about 125° C. to 130° C.) is maintained over the molten sulphur in the furnace during the heating operation. A water solution of a compound capable of elevating the boiling point of the solution to the desired value is employed as the aqueous medium. A water solution of an organic compound such as ethylene glycol is eminently satisfactory so far as its chemical and physical properties are concerned, but its cost is rather high for commercial use. A water solution of an inorganic compound such as calcium chloride is in most respects as satisfactory as a solution of ethylene glycol, and because of its much lower cost, is well suited for use on a commercial scale. Consequently a water solution of calcium chloride constitutes the preferred aqueous medium, and particular reference is made herein to the use of such a solution. It is understood, however, that the invention contemplates the use of other solutions than those of calcium chloride.

In operating the furnace in the preferred manner, the ore is charged into it substantially continuously. Calcium chloride solution also is charged into the furnace substantially continuously along with the ore and at a rate sufficient to maintain a layer of solution over the molten sulphur. Hot gases from a suitable burner are also introduced into the furnace to supply the heat necessary to melt the sulphur of the ore. The hot gases are introduced above the layer of solution, and the heat is transmitted at least in part through the layer of solution to the molten sulphur and the ore in contact with it. The layer of solution thereby acts to aid in preventing overheating of the molten sulphur, for the temperature of the solution cannot be brought to above its boiling point and its boiling point, determined by its content of calcium chloride, is below the point at which the molten sulphur would become viscous. The hot gases also heat the lining of the furnace, and as the furnace rotates, the thus heated lining is carried below the surface of the molten sulphur, whereupon this heat is transferred to the molten sulphur. By avoiding heating of the furnace too intensely, the heat thus transferred to the molten sulphur does not raise its temperature to an objectionable extent, for it is soon absorbed in the melting of sulphur from the ore.

The hot gases preferably are passed through the furnace concurrently with the ore and molten sulphur, because the greatest amount of heat is required in the section of the furnace where the ore first enters and where unfused sulphur exists in considerable quantities, while heating of the furnace contents in the section where the sulphur is wholly or almost wholly melted is to be avoided.

In the furnace the sulphur of the ore is melted and the thus melted sulphur is incorporated in the body of molten sulphur. The ore, being immersed in the body of molten sulphur, is not heated directly by the hot gases passing through the furnace, but rather by the molten sulphur in the furnace. The heat of the gases is first transferred to the molten sulphur, which in turn transfers it to the sulphur of the ore to effect the melting thereof. As fast as the sulphur of the ore is melted, it is incorporated in the body of the molten sulphur, and since the molten sulphur penetrates virtually the entire mass of the ore, the elemental sulphur of the ore is virtually completely fused and incorporated in the body of molten sulphur. As mentioned above, the body of molten sulphur thus may be regarded as acting as a "solvent" for the sulphur of the ore.

During the melting operation the layer of calcium chloride solution protects the molten sulphur from ignition by the hot gases, and aids in preventing overheating of the molten sulphur.

Rotation of the furnace during the melting operation causes the unfused gangue and other solid matter to advance through the furnace to the discharge end, and also provides gentle agitation for the charge in the furnace, thereby to insure thorough melting of the sulphur of the ore by the body of molten sulphur and avoidance of local overheating of the body of molten sulphur. At the discharge end of the furnace the used heating gases are allowed to escape, and a mixture of molten sulphur, gangue, and calcium chloride solution are withdrawn. The mixture withdrawn is treated to separate the coarse gangue from the liquids, for example by a screening operation. Thus, the mixture may be passed through a trommel, the coarse gangue being discharged at the end and the liquids and fine gangue passing through the meshes of the trommel to a suitable separating tank.

In the separating tank the mixture of molten sulphur, liquid, and fine gangue is held more or less quiet. The molten sulphur and calcium chloride solution separate by gravity, the molten sulphur collecting at the bottom of the tank with the calcium chloride solution floating on its surface. The finely divided gangue tends to collect in the calcium chloride solution, so that the molten sulphur is substantially clean and pure. It is withdrawn from the bottom of the tank and is suitably prepared for the market.

The calcium chloride solution, containing the bulk of the finely divided gangue, or slimes, is withdrawn from the upper portion of the tank and is suitably treated, for example as described below, to separate these solid impurities, after which it is re-employed in the treatment of a further quantity of ore.

Advantageously a middling product, consisting essentially of molten sulphur containing some calcium chloride solution and some finely divided gangue, is also withdrawn from the settling tank about from the interface of the molten sulphur and the calcium chloride and is recirculated through the melting furnace. Thus a circulating load of molten sulphur passes through the furnace. This recirculation is not essential but it is advantageous in order to maintain an adequate body of molten sulphur in the furnaces. If desired, of course, pure molten sulphur from the bottom of the settling tank may be recirculated through the furnace in place of, or in conjunction with, the middling product. It is advantageous to recirculate the middling product, however, because the finely divided gangue or slimes do not always collect completely in the solution in the separation tank; some slimes remain in the molten sulphur, and since these slimes are present for the most part at or near the interface of the molten sulphur and the solution in the separation tank, withdrawal of the middling product removes these slimes from the tank and thus prevents contaminating the molten sulphur at the bottom of the tank with them.

The coarse gangue separated from the molten sulphur and the calcium chloride solution during the screening operation will have become wetted with the calcium chloride solution, and since the solution is fairly concentrated, it is worthwhile to recover the calcium chloride which the coarse gangue has thus collected. The coarse gangue therefore is introduced into a rake type classifier, along with some wash water. The wash water dissolves the calcium chloride from the gangue, and the gangue raked to the top of the classifier is discharged to waste.

The overflow from the classifier, comprising a solution of calcium chloride and some finely divided gangue, passes to a thickener tank, where it is united with the calcium chloride solution separated from the molten sulphur in the separation tank. The solution in the thickener is held more or less quiet, and the finely divided slimes settle to the bottom. Advantageously a little wash water is passed countercurrently through the thickener. The clarified calcium chloride solution overflows at the top of the thickener and thence is passed to a storage vessel from which it may be introduced into the sulphur melting furnace for the treatment of a further quantity of sulphur ore.

The slimes settling to the bottom of the thickener are withdrawn and introduced into a second thickener tank in contact with wash water and relatively dilute calcium chloride solution. In this thickener the bulk of the calcium chloride is dissolved from the slimes. The slimes settle to the bottom of the thickener and are then withdrawn to a filter, where the calcium chloride solution contained in them is separated. Advantageously the slimes in the filter are subjected to countercurrent washing to extract as much as possible of the calcium chloride that they contain. The filtered slimes are discharged to waste.

The filtrate from the filtering operation is returned to the second thickener. The overflow from this thickener, which is a relatively dilute clarified calcium chloride solution, is passed to the first thickener where it is united with the calcium chloride solution from the separation tank and the washings from the classifier for the recovery of its calcium chloride content.

The total amount of wash water employed per unit of time in washing the gangue in the classifier, in the thickeners, and on the filter should about equal the amount of water evaporated from the solution in the same unit of time in the melting furnace and at other points in the system plus the amount of water contained in the discarded gangue. In this manner the maintenance of a calcium chloride solution of substantially uniform concentration for use in the melting furnace is assured. To make up for such losses of calcium chloride as may unavoidably occur, calcium chloride may be added to the solution at any suitable point, advantageously in the storage vessel.

The process of the invention results in the production of a clean bright sulphur product of a high degree of purity. The calcium chloride solution or other aqueous medium used is substantially completely recovered for reuse, so that there is very little loss from this source. The process is well suited to commercial application in the treatment of sulphur bearing ores. It is economical in operation and may be carried out without particular difficulty. The percentage recovery of sulphur from the ore is high, and the sulphur product obtained is suitable for almost any commercial use.

We claim:

1. The method of recovering sulphur from sulphur ores which comprises introducing the ore into a melting chamber in which there is maintained a substantial body of molten sulphur, heating the ore in the chamber while in contact with the body of molten sulphur at a temperature above the melting point of sulphur but below the temperature at which molten sulphur becomes viscous, thereby to melt the sulphur of the ore and to incorporate it in the body of molten sulphur, withdrawing molten sulphur and unfused residue of the ore from the chamber, and maintaining the withdrawn products quiescent to effect separation of the molten sulphur from the unfused residue.

2. The method of recovering sulphur from sulphur ores which comprises introducing the ore continuously into a melting chamber in which there is maintained a substantial body of molten sulphur, heating the ore in the chamber while in contact with the body of molten sulphur at a temperature above the melting point of sulphur but below about 150° C., thereby to melt the sulphur of the ore and to incorporate it in the body of molten sulphur, withdrawing molten sulphur and unfused residue of the ore continuously from the chamber, and maintaining the withdrawn products quiescent to effect separation of the molten sulphur from the unfused residue.

3. The method of recovering sulphur from sulphur ores which comprises introducing the ore continuously into a melting chamber in which there is maintained a substantial body of molten sulphur, heating the ore in the chamber while in contact with the body of molten sulphur at a temperature above the melting point of sulphur but below about 150° C., thereby to melt the sulphur of the ore and to incorporate it in the body of molten sulphur, withdrawing molten sulphur and unfused residue of the ore continuously from the chamber, maintaining the withdrawn products quiescent to effect separation of the molten sulphur from the unfused residue, and returning a portion of the separated sulphur to the melting chamber in order to maintain an adequate body of molten sulphur therein.

4. The method of recovering sulphur from sulphur ores which comprises subjecting the ore while at least partially immersed in a substantial body of molten sulphur in a suitable melting chamber to a heating operation at a temperature above the melting point of sulphur but below about 150° C. to melt the sulphur of the ore and incorporate it in the body of molten sulphur, maintaining a layer of an aqueous solution of a compound capable of increasing the boiling point of the solution to above the melting point of sulphur over the molten sulphur and the ore during the heating operation, subsequently withdrawing molten sulphur, aqueous solution, and unfused residue from the melting chamber, and maintaining the withdrawn products quiescent to effect separation of the molten sulphur from the aqueous solution and the unfused residue of the ore.

5. The method of recovering sulphur from sulphur ores which comprises subjecting the ore while in contact with a substantial body of molten sulphur in a suitable melting chamber to a heating operation to melt the sulphur of the ore, maintaining a layer of an aqueous medium having a boiling point above the melting point of sulphur over the melted sulphur during the heating operation, withdrawing molten sulphur, unfused residue and aqueous medium from the melting chamber to a suitable separation chamber in which the withdrawn products are maintained substantially quiescent and in which unfused residue and aqueous medium separate from the molten sulphur, withdrawing molten sulphur from the bottom of the separation chamber, withdrawing aqueous medium and unfused residue from the top of the chamber, withdrawing a middling product containing molten sulphur about from the interface of the molten sulphur and the aqueous medium, and returning the middling product to maintain an adequate body of molten sulphur in the melting chamber.

6. In the recovery of molten sulphur from sulphur ores, the improvement which comprises introducing the ore into a rotary furnace in contact with a substantial body of molten sulphur maintained therein beneath a layer of an aqueous solution containing calcium chloride in amount sufficient to elevate the boiling point of the solution to above the melting point of sulphur, rotating the furnace while introducing heat into the furnace above the layer of aqueous medium to heat the ore to a temperature above the melting point of sulphur but below about 150° C., thereby to melt the sulphur of the ore, withdrawing melted sulphur, unfused residue and aqueous medium from the furnace, and maintaining the withdrawn products quiescent to effect separation of the molten sulphur from the unfused residue and aqueous medium.

7. The method of recovering sulphur from sulphur ores which comprises subjecting the ore, while substantially immersed in a substantial body of molten sulphur in a suitable melting chamber, to a heating operation at a temperature above the melting point of sulphur but below about 150° C. to melt the sulphur of the ore and incorporate it in the body of molten sulphur, maintaining a layer of an aqueous solution containing calcium chloride in an amount sufficient to raise the boiling point of the solution to above the melting point of sulphur over the molten sulphur and the ore during the heating operation, subsequently withdrawing molten sulphur, aqueous solution and unfused residue from the melting chamber, and maintaining the withdrawn products quiescent to effect separation of the molten sulphur from the aqueous solution and the unfused residue of the ore.

8. The method of recovering sulphur from sulphur ores which comprises subjecting the ore, while substantially immersed in a substantial body of molten sulphur in a suitable melting chamber, to a heating operation at a temperature above the melting point of sulphur but below about 150° C. to melt the sulphur of the ore and incorporate it in the body of molten sulphur, maintaining a layer of an aqueous solution containing ethylene glycol in an amount sufficient to raise the boiling point of the solution to above the melting point of sulphur over the molten sulphur and the ore during the heating operation, subsequently withdrawing molten sulphur, aqueous solution and unfused residue from the melting chamber, and maintaining the withdrawn products quiescent to effect separation of the molten sulphur from the aqueous solution and the unfused residue of the ore.

ERNEST KLEPETKO.
LEO G. WRIGHT.